(12) United States Patent
Ross

(10) Patent No.: US 7,848,325 B2
(45) Date of Patent: Dec. 7, 2010

(54) DECOUPLED HEADER AND PACKET PROCESSING IN IPSEC

(75) Inventor: David Charles Ross, Ryde (AU)

(73) Assignee: Canon Kabushiki Kaisha, Tokyo (JP)

( * ) Notice: Subject to any disclaimer, the term of this patent is extended or adjusted under 35 U.S.C. 154(b) by 512 days.

(21) Appl. No.: 11/530,405

(22) Filed: Sep. 8, 2006

(65) Prior Publication Data

US 2007/0071007 A1 Mar. 29, 2007

(30) Foreign Application Priority Data

Sep. 28, 2005 (AU) .............................. 2005218009

(51) Int. Cl.
*H04L 12/28* (2006.01)
*H04L 12/56* (2006.01)
(52) U.S. Cl. ...................... 370/392; 379/242; 710/316
(58) Field of Classification Search ................ 370/401; 713/153, 189, 160
See application file for complete search history.

(56) References Cited

U.S. PATENT DOCUMENTS

| | | | |
|---|---|---|---|
| 7,023,863 B1* | 4/2006 | Naudus et al. | 370/401 |
| 7,370,348 B1* | 5/2008 | Patel et al. | 726/5 |
| 2002/0142818 A1 | 10/2002 | Nakatsuka | |
| 2002/0188839 A1 | 12/2002 | Noehring | |
| 2004/0143734 A1* | 7/2004 | Buer et al. | 713/153 |
| 2004/0205336 A1* | 10/2004 | Kessler et al. | 713/160 |
| 2005/0060558 A1* | 3/2005 | Hussain et al. | 713/189 |
| 2005/0256975 A1* | 11/2005 | Kaniz et al. | 709/250 |
| 2007/0071007 A1 | 3/2007 | Ross | |

* cited by examiner

*Primary Examiner*—Robert W Wilson
*Assistant Examiner*—Lionel Preval
(74) *Attorney, Agent, or Firm*—Fitzpatrick, Cella, Harper & Scinto

(57) ABSTRACT

An IPsec processor for performing IPsec processing of traffic packets is disclosed. The IPsec processor comprises a network processing module (500) and a hardware co-processing module (502) coupled to the network processing module (500) via an interface, the co-processing module (500) comprising a policy check processor (525), and a packet transform processor (526). The network processing module (500) is adapted for communicating a part of a packet to the policy check processor (525) via the interface, and if IPsec processing of the packet is required, communicating the packet to the packet transform processor (526) via the interface, and scheduling the IPsec processed said packet, received from the packet transform processor (526) via the interface, for forwarding.

10 Claims, 9 Drawing Sheets

--Prior Art--

—Prior Art—

DECOUPLED HEADER AND PACKET PROCESSING IN IPSEC

CROSS-REFERENCE TO RELATED APPLICATIONS

This application claims the right of priority under 35 U.S.C. §119 based on Australian Patent Application No. 2005218009 filed 28 Sep. 2005, which is incorporated by reference herein in its entirety as if fully set forth herein.

FIELD OF THE INVENTION

The current invention relates to computer network architectures implementing the IPsec protocol, and in particular to increasing the speed of processing of packets within the IPsec processing environment.

BACKGROUND

The Internet Protocol (IP) is widely used to communicate over the Internet, however this protocol is not secure. Consequently, third parties can potentially eavesdrop on transmitted packets, repeat transmitted packets or divert packets off the network and replace the diverted packets with locally created or forged packets.

IPsec is a standardised protocol suite for securing IP communications by encrypting and authenticating IP packets. Members of the IPsec protocol suite include the Encapsulating Security Payload (ESP) and the Authentication Header (AH) protocols. The act of applying a protocol to an IP packet is known as a "transformation".

IPsec protocols typically use one or more cryptographic algorithms to provide the services offered by the protocol. In typical computing systems, a specialised module called the Network Processing Unit (NPU) deals with network issues such as packet routing and processing. Computationally intensive functions like encryption and compression generally cannot be performed by the NPU with adequate levels of performance, particularly if the NPU is implemented in software executing on a Central Processor Unit (CPU). A separate hardware module referred to as a Security Processor Unit (SPU) is often used to offload IPsec functionality from the NPU. The SPU typically provides hardware acceleration in order to achieve the required performance.

There are several common architectures used to integrate an SPU into a system. One architecture is referred to as the "Flow-Through" architecture 108 as shown in FIG. 1. This architecture 108 is often referred to as "Bump-In-The-Stack" or "Bump-In-The-Wire", depending on the placement of the SPU. Traffic, made up of transmit packets (also referred to as Tx packets) on the transmit path (ie. in the direction of arrows 110-113) originates at an Application Layer 106, passes down as depicted by respective arrows 110, 111 and 112 through a Network Processor 104, a Security Processor 102, and finally via a Link Layer 100 to the network 420 (see FIG. 3) as depicted by an arrow 113. A similar, reversed traffic flow of receive packets (also referred to as Rx packets) occurs for a receive path, depicted by respective arrows 114-117. This architecture 108 is commonly used in security gateways, but is expensive due to increased speed and complexity required in the SPU 102. It is also difficult to make the SPU 102 an optional unit because the SPU 102 becomes an integral part of the system 108.

Another architecture 208 is the "Look-Aside" architecture shown in FIG. 2. This architecture is commonly found in host machines. In this case the SPU is often referred to as a "co-processor", or an "offload engine". For the transmit path, traffic originates in an Application Layer 206 and passes down, as shown by an arrow 210, to a Network Processor 204. The Network Processor 204 passes the traffic, according to an arrow 216, to a Security Processor 202 for security processing. The processed packet is forwarded from the Security Processor 202, as shown by an arrow 215, back to the Network Processor 204, which passes the traffic, as depicted by an arrow 211, to a Link Layer 200 and on, according to an arrow 212 to the network 420 (see FIG. 3). A similar, reversed traffic flow occurs for the receive path, depicted by respective arrows 213-214-217.

The look-aside architecture is more popular in hosts because it reduces the complexity of the SPU. Furthermore, the existing functionality of the NPU 204, such as buffering and fragmentation, can be reused in the IPsec implementation 208 of FIG. 2. In the architecture 208 it is relatively straightforward to make the SPU 202 a "pluggable" component. According to this approach, a low-cost device could omit the SPU 202, whereas a high-performance device would include the SPU 202.

Not all packets in an IPsec system are required to undergo transformation. Thus some packets require no IPsec processing at all, while other packets are required to undergo multiple transformations. IPsec has a method for establishing whether IPsec transformations are to be applied to a packet in a traffic stream. The rules that specify the behaviour of IPsec in regard to different packets are known as Security Policies (SPs). These SPs are created prior to processing network traffic, and are stored in a database known as a Security Policy Database (SPD).

IPsec requires that every packet be checked against the SPD, in a process known as Policy Checking. Not all traffic being communicated in an IPsec system need be secure. Typically, traffic comprises some traffic which must be secure, and other traffic where security is less of an issue or not important at all. There is thus typically a mixture of "secure" and "non-secure" traffic in a given traffic stream, often resulting from different, concurrent, higher layer sessions. The terms "secure" and "non-secure" refer respectively to packets that are to have IPsec processing applied to them, and those that do not.

The result of a policy check leads to one of three possible actions being applicable to the packet in question, namely "Apply", "Bypass", or "Discard". The Apply rule means that the packet is to be transformed by IPsec, ie, it is a secure packet which is to be subjected to IPsec processing. The Bypass rule means that the packet is not to be transformed by IPsec, ie it is a non-secure packet. The Discard rule means the packet is to be dropped.

Because all packets must undergo policy checking, the rate at which the SPU is able to receive packets from the NPU, check packet policies, and apply protocol transformations typically has a significant influence on the performance of a system.

In the flow-through architecture, all packets, secure and non-secure, pass through the SPU. After receiving a packet the SPU performs a policy lookup. Packets determined to be secure can be held for transformation whereas non-secure packets can be forwarded without further processing. Sequential integration of policy lookup and transformation means non-secure packets are delayed by secure ones.

In the look-aside architecture, in one current arrangement, all packets are sent from the NPU 204 to the SPU 202 for policy checking and transformation. If a packet is determined to be in a non-secure category, then a notification is returned from the SPU 202 to the NPU 204 to forward the packet. In contrast, for traffic in a secure category, the NPU 204 must wait for a transformed packet to be returned to the NPU 204 from the SPU 202. This typically results in non-secure packets being delayed while the SPU 202 performs security processing of packets in secure categories.

SUMMARY

It is an object of the present invention to substantially overcome, or at least ameliorate, one or more disadvantages of existing arrangements.

Disclosed are arrangements which seek to address the above problems by using a decoupled SPU architecture, where the policy checking and transformation functions in the SPU are separated and can operate in parallel. This is referred to as the decoupled IPsec processing approach.

By enabling non-secure packets to be processed by a policy check unit while secure packets are being transformed, non-secure traffic is less subject to a bottleneck delay caused by processing of secure packets undergoing packet transformation. Once a packet is known to be non-secure the non-secure packet can be forwarded on, sometimes ahead of secure packets being queued for security transformation. This reduces the latency of non-secure traffic in a system with a mixture of secure and non-secure traffic, and thus increases overall throughput.

Further, the amount of traffic that is sent between the NPU 204 and the SPU 202 can be reduced. Preferably, only a minimal first amount of data (typically being the packet header) is transferred to the SPU 202 for the determination of the packet policy. Only after it is known that the packet requires security processing is the remainder of the packet forwarded for transformation from the NPU 204 to the SPU 202. This further reduces the latency of non-secure traffic.

According to a first aspect of the present invention, there is provided an IPsec processor for performing IPsec processing of traffic packets, the IPsec processor comprising:
 a network processing module; and
 a hardware co-processing module coupled to the network processing module via an interface, the co-processing module comprising a policy check processor, and a packet transform processor; wherein,
 the network processing module is adapted for:
 communicating a part of a packet to the policy check processor via the interface;
 if IPsec processing of the packet is required, communicating the packet to the packet transform processor via the interface; and
 scheduling the IPsec processed said packet, received from the packet transform processor via the interface, for forwarding;
 the policy check processor is adapted for:
 checking the part of the packet to determine if IPsec processing of the packet is required; and
 the packet transform processor is adapted for:
 applying IPsec processing to the packet; and
 communicating the IPsec processed said packet to the network processing module via the interface.

In one implementation the policy check processor may be adapted for notifying the network processing module if IPsec processing of the packet is required.

According to another aspect of the present invention, there is provided an IPsec processor for performing IPsec processing of traffic packets the IPsec processor comprising:
 (a) means for communicating a part of a packet from a network processor module to a policy check processor via an interface;
 (b) means for checking by the policy check processor the part of the packet to determine if IPsec processing of the packet is required;
 (c) means if IPsec processing of the packet is required for communicating the packet from the network processing module to a packet transform processor via the interface;
 (d) means for applying IPsec processing to the packet by the packet transform processor;
 (e) means for communicating the IPsec processed said packet from the packet transform processor to the network processing module via the interface; and
 (f) means for scheduling by the network processing module the IP processed said packet for forwarding.

According to another aspect of the present invention, there is provided an IPsec processor for performing IPsec processing of traffic packets the IPsec processor comprising:
 a memory for storing a program; and
 a processor for executing the program, said program comprising:
 (a) code for communicating a part of a packet from a network processor module to a policy check processor via an interface;
 (b) code for checking by the policy check processor the part of the packet to determine if IPsec processing of the packet is required;
 (c) code if IPsec processing of the packet is required for communicating the packet from the network processing module to a packet transform processor via the interface;
 (d) code for applying IPsec processing to the packet by the packet transform processor;
 (e) code for communicating the IPsec processed said packet from the packet transform processor to the network processing module via the interface; and
 (f) code for scheduling by the network processing module the IP processed said packet for forwarding.

According to another aspect of the present invention, there is provided a computer program product including a computer readable medium having recorded thereon a computer program for directing a processor to execute a method for performing IPsec processing of traffic packets, said program comprising:
 (a) code for communicating a part of a packet from a network processor module to a policy check processor via an interface;
 (b) code for checking by the policy check processor the part of the packet to determine if IPsec processing of the packet is required;
 (c) code if IPsec processing of the packet is required for communicating the packet from the network processing module to a packet transform processor via the interface;
 (d) code for applying IPsec processing to the packet by the packet transform processor;
 (e) code for communicating the IPsec processed said packet from the packet transform processor to the network processing module via the interface; and
 (f) code for scheduling by the network processing module the IP processed said packet for forwarding.

According to another aspect of the present invention, there is provided a method of performing IPsec processing of traffic packets in an apparatus comprising a network processing module and a hardware co-processing module coupled to the network processing module via an interface, the co-processing module comprising a policy check processor, and a packet transform processor, the method comprising, for a current packet, the steps of:

(a) communicating a part of the packet from the network processor module to the policy check processor via the interface;

(b) checking by the policy check processor the part of the packet to determine if IPsec processing of the packet is required;

(c) if IPsec processing of the packet is required communicating the packet from the network processing module to the packet transform processor via the interface;

(d) applying IPsec processing to the packet by the packet transform processor;

(e) communicating the IPsec processed said packet from the packet transform processor to the network processing module via the interface; and (f) scheduling by the network processing module the IP processed said packet for forwarding.

According to another aspect of the present invention, there is provided an IP packet processed according to any one of the above-noted methods or by any one of the above-noted devices.

Other aspects of the invention are also disclosed.

BRIEF DESCRIPTION OF THE DRAWINGS

Some aspects of the prior art and one or more embodiments of the present invention will now be described with reference to the drawings, in which.

DETAILED DESCRIPTION INCLUDING BEST MODE

Figure 1:
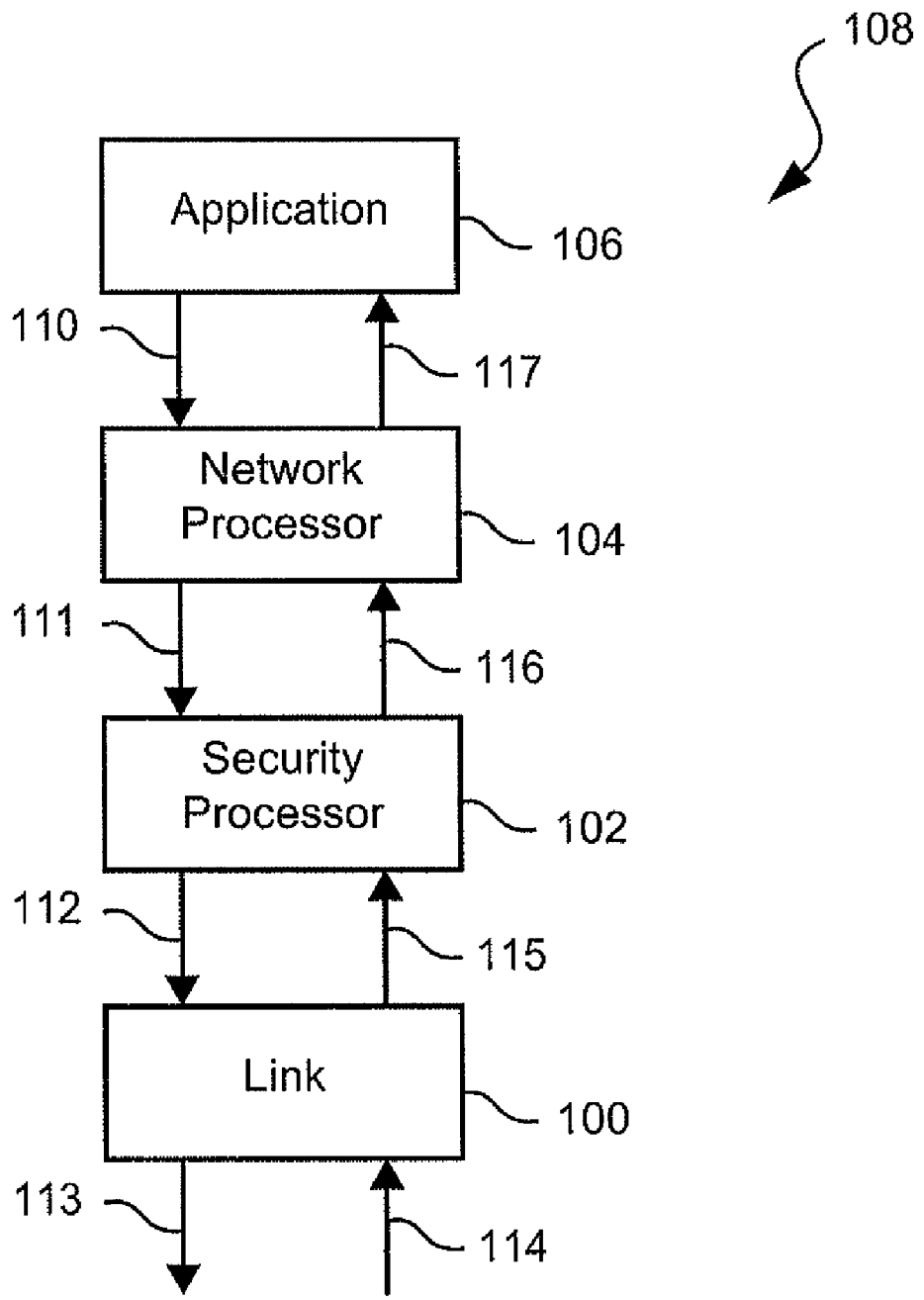
FIG. 1 is a block diagram illustrating a generic flow-through network architecture.

Where reference is made in any one or more of the accompanying drawings to steps and/or features, which have the same reference numerals, those steps and/or features have for the purposes of this description the same function(s) or operation(s), unless the contrary intention appears.

Figure 3:
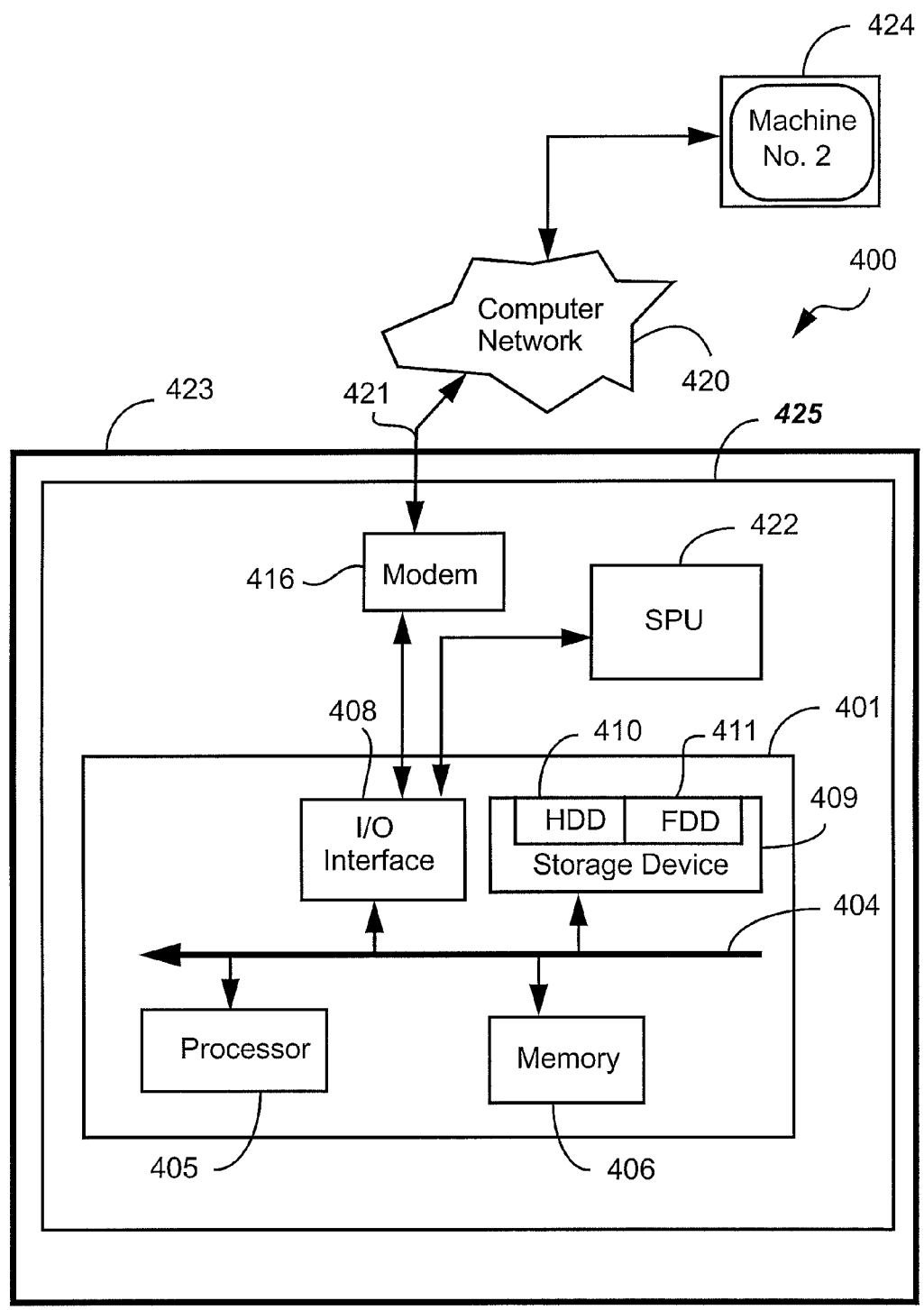
FIG. 3 is a functional block diagram of a special-purpose computer system upon which described methods for effecting the decoupled IPsec processing approach can be practiced.

FIG. 3 is a functional block diagram of a special-purpose computer system 400 upon which described methods for effecting the decoupled IPsec processing approach can be practiced. The system 400 comprises a first machine 423 that sends and receives packet traffic via an IPsec processor 425 to a second machine 424, over the network 420. The IPsec processor 425 comprises an NPU 401 and an SPU 422. The processes of FIGS. 8-10 may be implemented as software, such as a decoupled IPsec processing application program executing within the IPsec processor 425. In particular, the steps of the method of decoupled IPsec processing are effected by instructions in the software that are carried out by the IPsec processor 425. The software may be divided into two separate parts; one part for carrying out the decoupled IPsec processing methods, and another part to manage the user interface between the latter and the user. The software may be stored in a computer readable medium, including the storage devices described below, for example. The software is loaded into the IPsec processor 425 from the computer readable medium, and then executed by the IPsec processor 425. A computer readable medium having such software or computer program recorded on it is a computer program product. The use of the computer program product in the IPsec processor 425 preferably effects an advantageous apparatus for decoupled IPsec processing in accordance with the embodiments of the invention.

The computer system 400 comprises the NPU 401, and the SPU 422. The internal componentry of the NPU 401 is shown in detail. The componentry of the SPU 422 can be of a similar form as that of the NPU 401. Alternately, the SPU 422 can comprise dedicated hardware, for example an ASIC or FPGA, and/or digital signal processors, or one or more microprocessors and associated memories.

A Modulator-Demodulator (Modem) transceiver device 416 is used by the NPU 401 for communicating to and from the communications network 420, for example connectable via a telephone line 421 or other functional medium. The modem 416 can be used to obtain access to the second machine 424 and other network systems over the Internet, Local Area Networks (LANs) and or Wide Area Networks (WANs).

The NPU 401 typically includes at least one processor unit 405, a memory unit 406, for example formed from semiconductor random access memory (RAM) and read only memory (ROM), and an interface 408 for the modem 416. A storage device 409 is provided and typically includes a hard disk drive 410 and a flash memory 411. The components 405, 406, 408, 409 of the NPU 401, typically communicate via an interconnected bus 404 and in a manner which results in a conventional mode of operation of the NPU 401 known to those in the relevant art.

Typically, the decoupled IPsec processing application program of the preferred embodiment is resident on the hard disk drive 410 and read and controlled in its execution by the processor 405. Intermediate storage of the program and any data fetched from the network 420 may be accomplished using the semiconductor memory 406, possibly in concert with the hard disk drive 410. In some instances, the decoupled IPsec processing application program may be supplied to the user encoded on flash memory 411, or alternatively may be read by the user from the network 420 via the modem device 416, such as a radio or infra-red transmission channel between the computer module 401 and another device or the Internet and Intranets including email transmissions and information recorded on websites and the like.

Still further, the decoupled IPsec processing software can also be loaded into the computer system 400 from other computer readable medium including magnetic tape, a ROM or integrated circuit, a magneto-optical disk, a computer readable card such as a PCMCIA card, and the like. The foregoing is merely exemplary of relevant computer readable mediums.

Other computer readable mediums may be practiced without departing from the scope and spirit of the invention.

Figure 2:
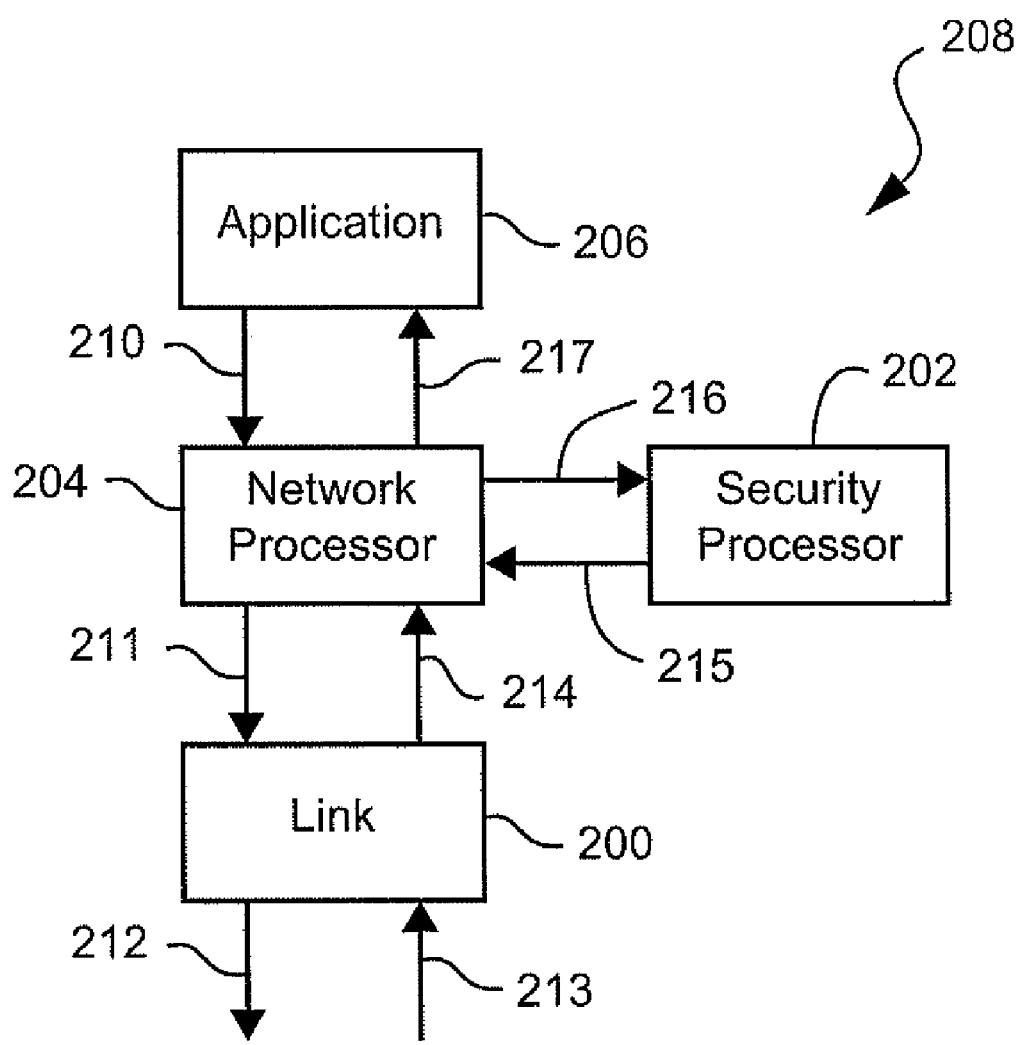
FIG. 2 is a block diagram illustrating a generic look-aside network architecture.
Figure 4:
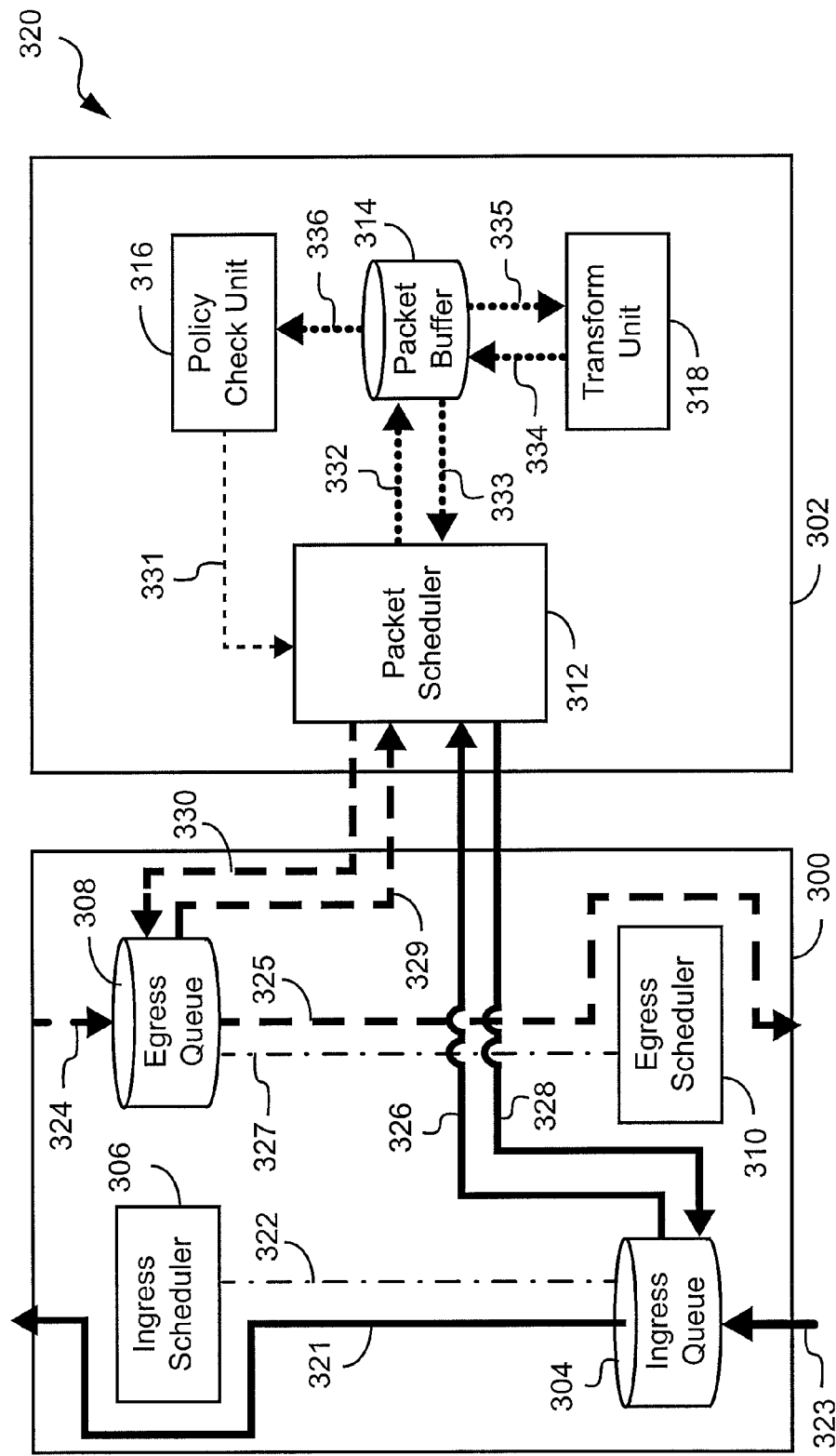
FIG. 4 is a block diagram showing the processing blocks and data flows in a prior-art implementation of the look-aside arrangement in FIG. 2.

FIG. 4 depicts a detailed view of the look-aside architecture of FIG. 2 according to a conventional look-aside arrangement. Only functional elements related to IPsec functionality are shown in FIG. 4.

Within a Network Processor Unit 300 there is an Ingress Queue 304 which buffers incoming Rx packets that are waiting for IPsec processing. IPsec processing occurs inside an SPU 302. Processed Rx packets are pushed out of the NPU 300 from the Ingress queue as depicted by an arrow 321 dependent upon a control signal depicted by a dashed line 322 from an Ingress Scheduler 306. For Tx packets, an Egress Queue 308 and an Egress Scheduler 310 are shown. The Egress Queue 308 buffers outgoing Tx packets that are waiting for IPsec processing in the SPU 302. Processed Tx packets are pushed out of the NPU 300 from the Egress queue 308 as depicted by an arrow 325 dependent upon a control signal depicted by a dashed line 327 from the Egress Scheduler 310.

IPsec can broadly be considered to comprise two operations, namely (a) determining the policy for the packet, and (b) applying protocol transforms to the packet if and as required by the policy. The functional modules that implement these operations are shown inside the Security Processor Unit 302 as a Policy Check Unit 316 and a Transform Unit 318. The Policy Check unit 316 and the Transform Unit 318 operate on a packet held in a Packet Buffer 314. The Packet Scheduler 312 arbitrates access to the Security Processor functionality. Accordingly, every Tx packet is sent from the Egress queue 308 to the packet buffer 314 for SPU processing. The packet is sent back to the Egress queue 308 after SPU processing, after which the Egress scheduler 310 controls the forwarding of the packet from the NPU 300. Similarly, every Rx packet is sent from the Ingress queue 304 to the packet buffer 314 for SPU processing. The packet is sent back to the Ingress queue 304 after SPU processing, after which the Ingress scheduler 306 controls the forwarding of the packet from the NPU 300.

Figure 5:
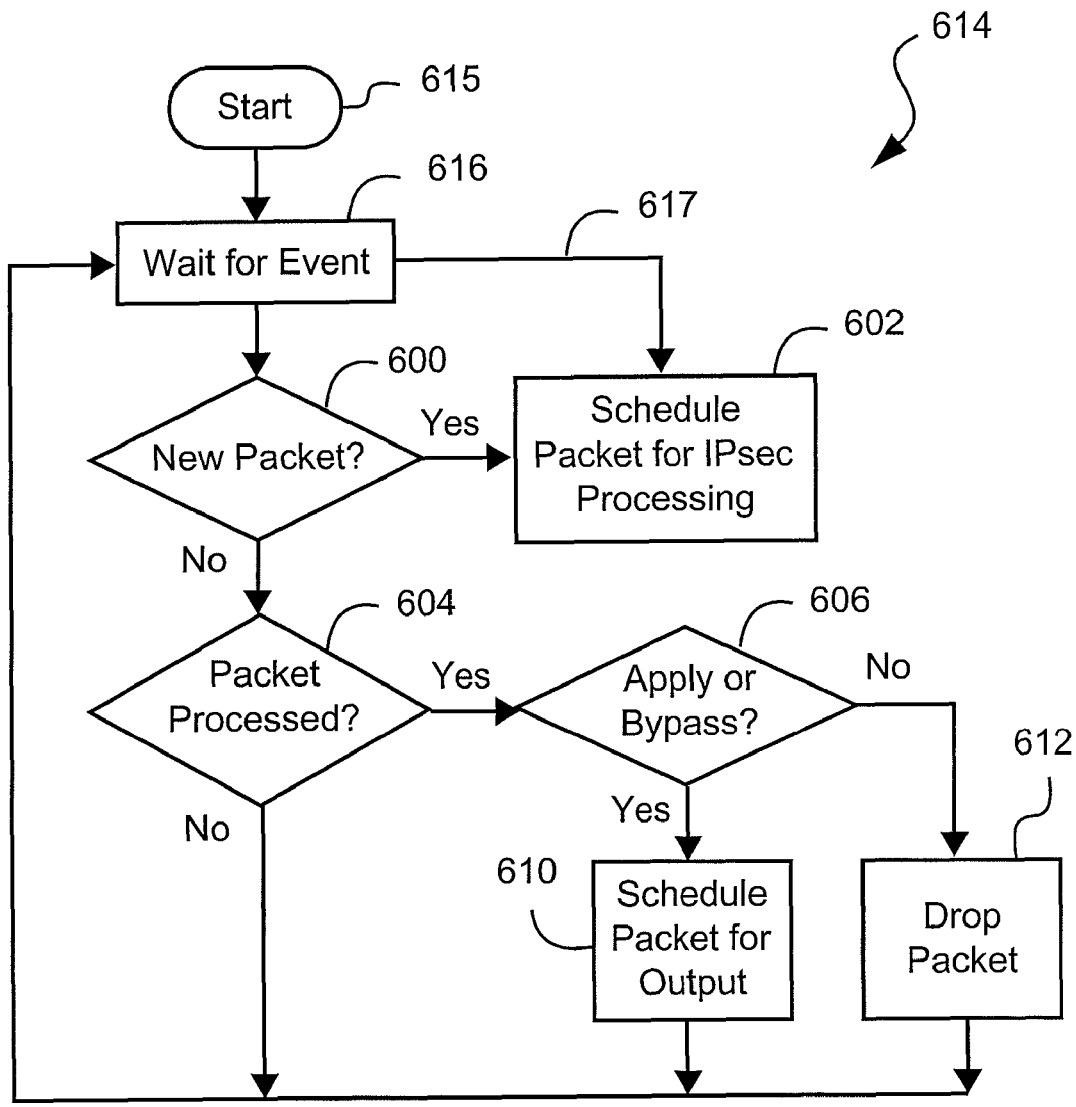
FIG. 5 is a flow diagram of the prior-art process in the NPU for the arrangement in FIG. 2.
Figure 6:
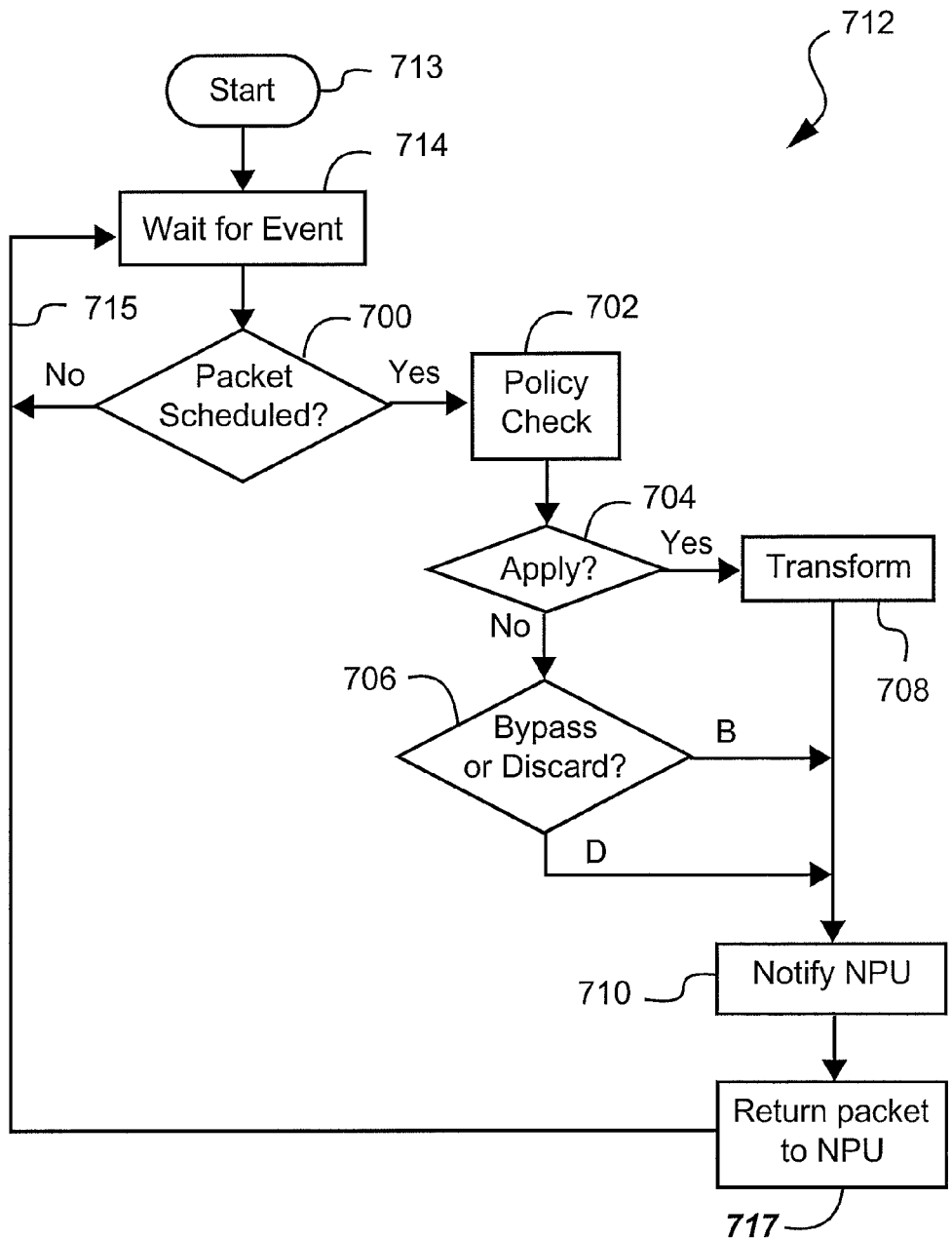
FIG. 6 is a flow diagram of the prior-art process in the SPU for the arrangement in FIG. 2.

FIG. 5 depicts a typical processing flow 614 for the prior art NPU 300 in FIG. 4, and FIG. 6 depicts a typical processing flow 712 for the prior art SPU 302 in FIG. 4. The NPU process 614 of FIG. 5 commences with a START step 615, after which a step 616 waits for an event. The SPU process 712 of FIG. 6 commences with a START step 713, after which a step 714 waits for an event.

In regard to FIG. 5, upon receipt of a new Rx packet via 323 into the Ingress queue 304, or upon receipt of a new Tx packet via 324 into the Egress queue 308 in FIG. 4, the NPU process 614 is directed to a step 600 which determines if a new Tx or Rx packet has been received. If the step 600 returns a logical TRUE value, then the NPU process 614 follows a YES arrow to a step 602 in which the NPU schedules the new packet for IPsec processing via the SPU Packet Scheduler 312. For an Rx packet the packet is directed as depicted by a bold arrow 326 from the Ingress queue 304 to the packet scheduler 312. For a Tx packet the packet is directed as depicted by a bold dashed arrow 329 from the Egress queue 308 to the packet scheduler 312. The packet scheduler 312 directs the packet to the packet buffer 314 as depicted by an arrow 332.

In regard to FIG. 6, the SPU Packet Scheduler 312 determines, in a step 700, if a packet has been scheduled to the packet buffer 314. If the step 700 returns a logical TRUE, then the SPU process 712 follows a YES arrow to step 702 in which the Policy Check unit 316 checks, as depicted by an arrow 336, the policy of the packet in the packet buffer 314, and informs the scheduler 312 as depicted by an arrow 331. In a following step 704, the result of the policy check from the step 702 is tested to determine if the "Apply" operation is to be performed. If this is the case, then the SPU process 712 is follows a YES arrow from the step 704 to a step 708 in which the Transform unit 318 applies the appropriate IPsec transform to the packet being held in the packet buffer 314 as depicted by arrows 335 and 334. Thereafter in a step 710 the SPU notifies the NPU that SPU processing is complete, and the SPU process 712 proceeds to a step 717 in which the packet scheduler 312 returns the packet in the packet buffer 314 to the Ingress queue 304 as depicted by arrows 333 and 328 (see FIG. 4), or to the Egress queue 308 as depicted by arrows 333 and 330. The SPU process 712 then follows an arrow 715 back to the step 714.

If the step 704 returns a logical FALSE, then the SPU process 712 follows a NO arrow from the step 704 to a step 706 which determines, on the basis of the result of the policy check 702 if the packet is to merely bypass the IPsec processing, or is to be discarded. If the packet is to merely bypass the IPsec processing, then the SPU process 712 follows a "B" arrow from the step 706 to the step 710, which notifies the NPU that the packet in question is to bypass the IPsec processing but is to otherwise be processed in a normal manner. If the packet is to be discarded, then the SPU process 712 follows a "D" arrow from the step 706 to the step 710, which notifies the NPU that the packet in question is to be discarded. The SPU process 712 then proceeds to a step 717 in which the packet scheduler 312 returns the packet in the packet buffer 314 to the Ingress queue 304 as depicted by arrows 333 and 328 (see FIG. 4), or to the Egress queue 308 as depicted by arrows 333 and 330. The SPU process 712 then follows an arrow 715 back to the step 714.

Alternatively, following step 710 a further check could be made as to whether the policy check of step 702 indicated the packet is to be discarded; if so, process 712 returns directly to step 714; otherwise, execution proceeds to step 717 described above.

Returning to FIG. 5, if the step 600 returns a logical FALSE value, then the NPU process 614 follows a NO arrow from the step 600 to a step 604 in which the NPU process 614 receives the notification from the step 710 of the SPU process 712 and determines if the packet is a processed packet. If this is the case, then the NPU process 614 follows a YES arrow to a step 606 which determines if the notification indicates an Apply or a Bypass action, or not. If an Apply or Bypass step is called for, then the NPU process 614 follows a YES arrow from the step 606 to a step 610 which directs the relevant scheduler 306 or 310 to respectively schedule the processed packet for onward Rx or Tx forwarding, from the respective queue 304 or 308. If on the other hand the step 606 returns a logical FALSE value, then the required action must be Discard, so the NPU process 614 follows a NO arrow to a step 612 which directs the relevant scheduler 306 or 310 to respectively drop the packet from the respective queue 304 or 308, after which execution returns to step 616 to await the next event.

Because IPsec requires policy checking for every packet, all packets traverse the interface between the NPU 300 and the SPU 302 at least once. Packets which do undergo IPsec transformation must then be returned across this same interface. This can have a detrimental effect on the throughput of the NPU-SPU interface, which can increase the latency of all packets passing through the system.

Furthermore, the Transform Unit 318 invariably becomes a bottleneck to the overall traffic flow. All packets, even those packets that will ultimately not make use of the Transform Unit 318, are stalled by the Packet Scheduler 312 while the time-consuming crypto-processing within the Transform Unit 318 is performed.

Figure 7:
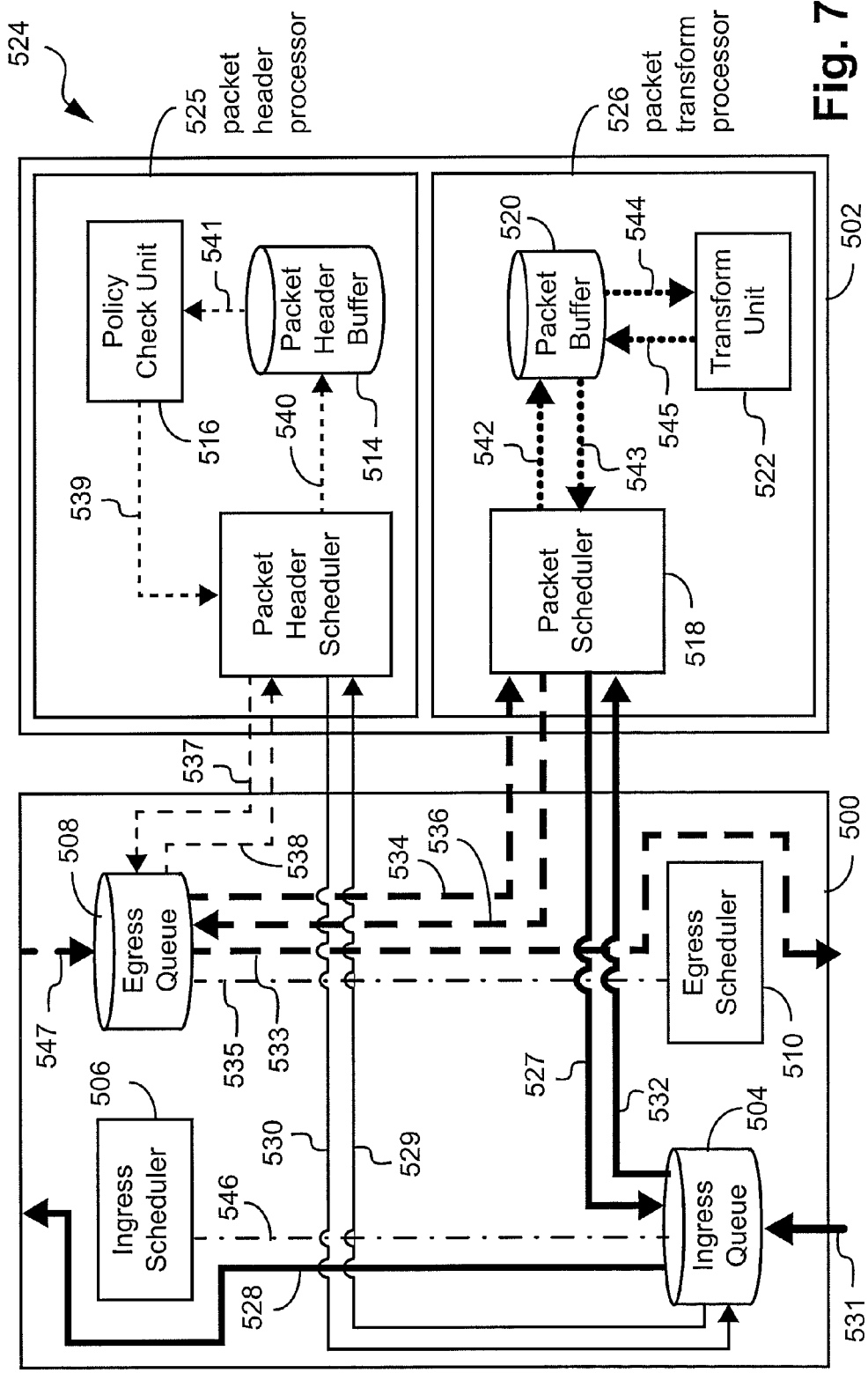
FIG. 7 is a functional block diagram showing the processing blocks and data flows according to a preferred arrangement of the disclosed decoupled IPsec processing approach.

FIG. 7 discloses a decoupled architecture according to the preferred arrangement of the decoupled IPsec processing approach, wherein a Policy Check Unit 516 and a Transform Unit 522 within an SPU 502 are logically and functionally separated. In the SPU 502 a new Packet Header Scheduler 512 and Packet Header Buffer 514 are created. The Packet Header Scheduler 512 and the Policy Check Unit 516 now act in parallel to the Packet Scheduler 518 and the Transform Unit 522. The Packet Header Scheduler 512, the Policy Check Unit 516 and the Packet Header Buffer 514 form a Packet Header Processor 525. The Packet Scheduler 518, the Packet Buffer 520, and the Transform Unit 522 form a Packet Transform Processor 526.

From a speed perspective, the Packet Header Processor 525 can cycle through the packets in the queues 508 and 504 considerably faster that the Packet Transform Processor 526 is able to do. This is because the processing load on the Packet Header Processor 525 is much lower, because it only processes part of the packets, namely the packet headers. Accordingly, the Packet Header Processor 525 is able to rapidly schedule non-secure packets (ie those packets not requiring IPsec processing) in the queues 508 and 504, effectively reordering the packets in the queues 508 and 504 to put at least some of the non-secure packets ahead of the secure packets. The extent to which the aforementioned reordering occurs depends, among other factors, on the relative numbers and distribution of secure and non-secure packets in the queues 508 and 504, and on the relative throughput of the Packet Header Processor 525 and the Packet Transform Processor 526.

For a given packet, the NPU 500 preferably sends only the minimal amount of packet data, namely the packet header, to the SPU's Packet Header Scheduler 512 for policy checking. The Policy Check Unit 516 quickly determines and returns the policy decision, being "Apply", "Bypass", or "Discard" to the Packet Header Scheduler 512. If, and only if, the policy is "Apply" does the NPU 500 need to send the rest of the packet data to the SPU's Packet Scheduler 518 for transformation by the Transform Unit 522. Alternatively, the NPU 500 could send the entire packet to the Packet Header Scheduler 512 for policy checking.

Figure 8:
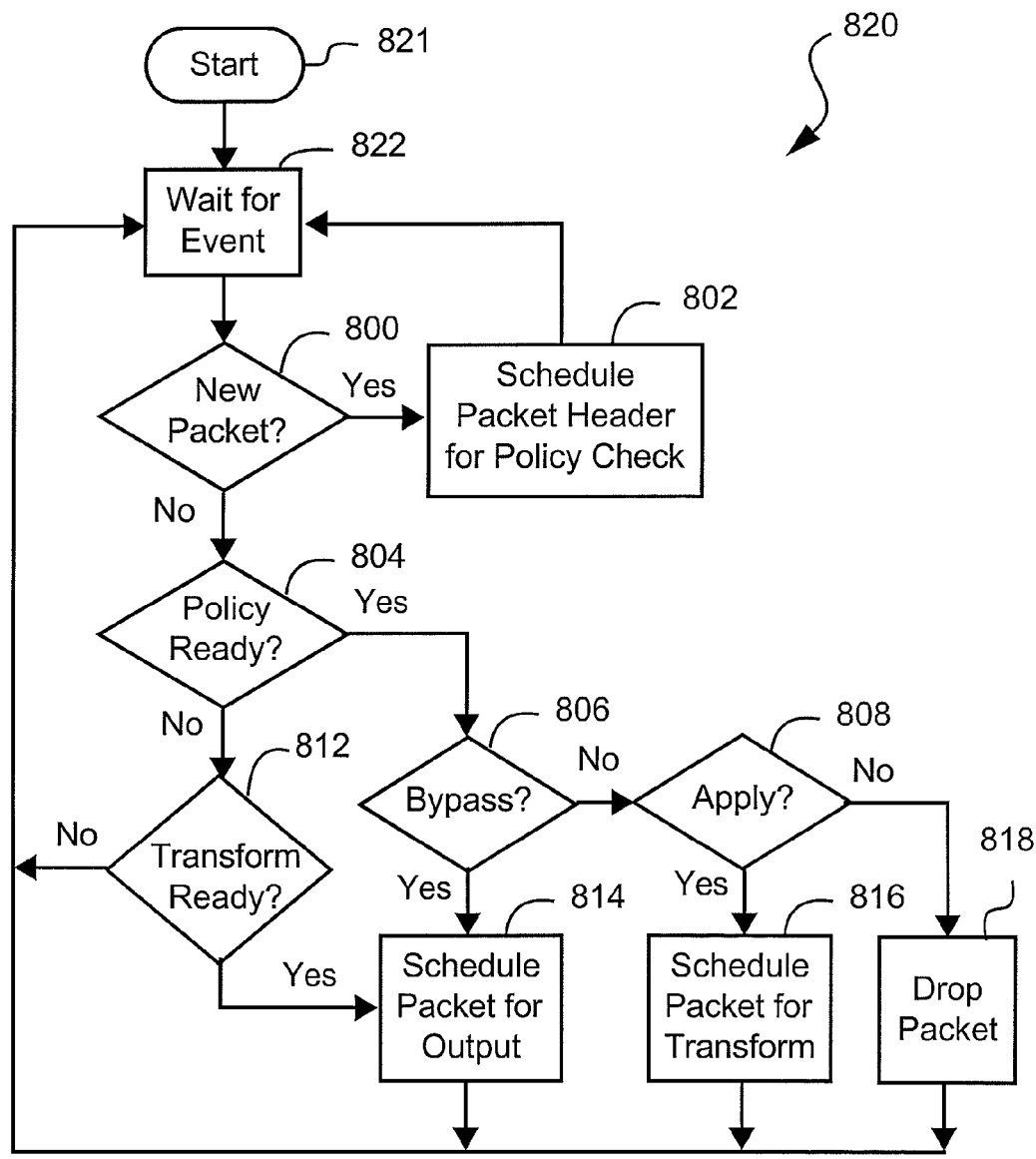
FIG. 8 is a flow diagram of the process in the NPU according to a preferred arrangement of the disclosed decoupled IPsec processing approach.
Figure 9:
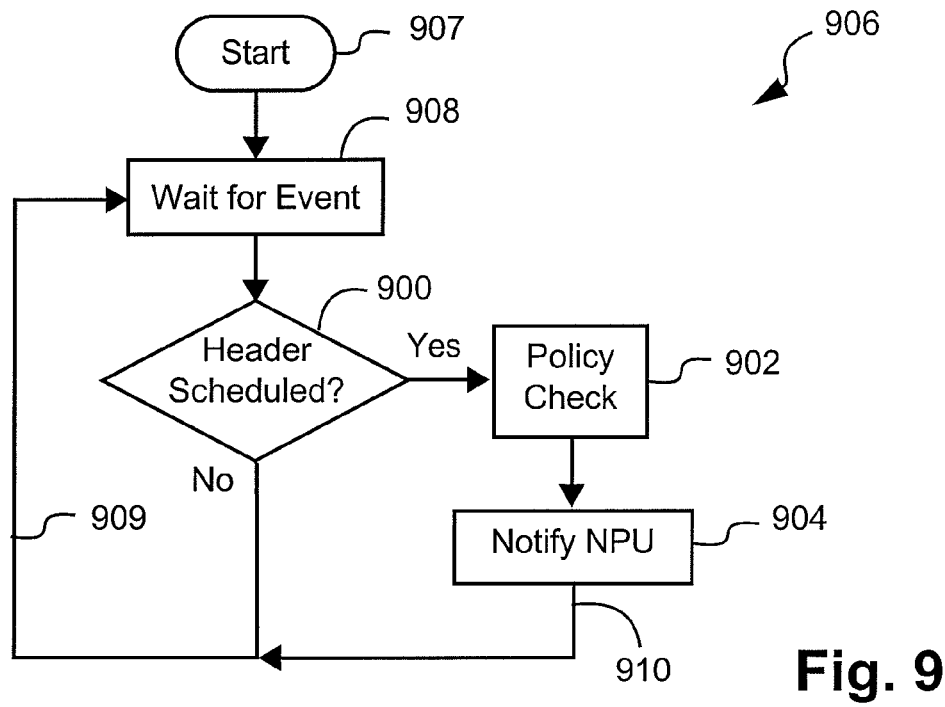
FIG. 9 is a flow diagram for the packet header processor (also referred to as the policy check processor) in the SPU according to the preferred arrangement of the decoupled IPsec processing approach.
Figure 10:
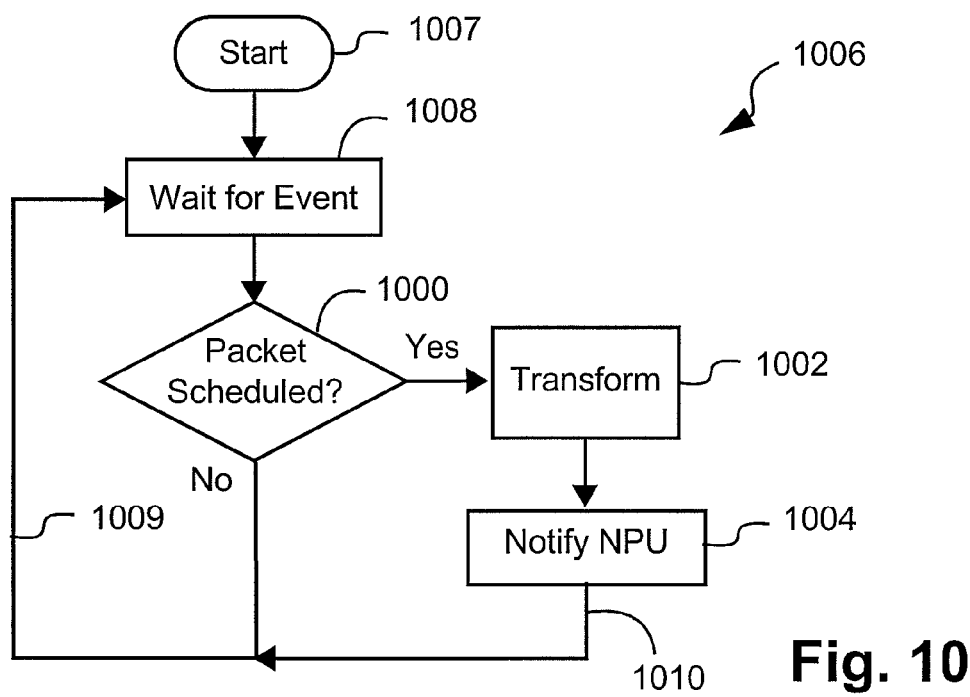
FIG. 10 is a flow diagram for the packet transform processor in the SPU according to the preferred arrangement of the decoupled IPsec processing approach.

FIG. 8 depicts a typical processing flow 820 for the NPU 500 in FIG. 7. FIG. 9 depicts a typical processing flow 906 for the packet header processor 525 in FIG. 7, and FIG. 10 depicts a typical processing flow 1006 for the Packet Transform Processor 526 in FIG. 7.

Turning to FIG. 8, the NPU process 820 commences with a START step 821, after which a step 822 waits for an event. The process 906 in FIG. 9 commences with a start step 907, after which a step 908 waits for an event. The process 1006 in FIG. 10 commences with a start step 1007, after which a step 1008 waits for an event.

Returning to FIG. 8, upon receipt of a new packet in an Ingress Queue 504 or an Egress Queue 508, the process 820 is directed to a step 800 which determines if a new packet has been received. If this is the case, then the process 820 follows a YES arrow to a step 802 in which the NPU 500 schedules, as depicted by respective lines 529 and 538 (in FIG. 7), the packet header of the received packet for policy checking by the Packet Header Scheduler 512 of the Packet Header Processor 525.

Turning to FIG. 9, the process 906 is directed from the step 908 to a step 900 in which the packet Header Processor 525 determines if the header has been scheduled to the Packet Header Buffer 514 via the line 540. If this is the case, then the process 906 follows a YES arrow to a step 902 which checks the policy using the Policy Check Unit 516 as indicated by the arrows 541 and 539. In a following step 904 the Packet Header Processor 525 notifies the NPU 500 of the result, being either Apply, Bypass, or Discard, by means of a byte code sent via the lines 537 or 530.

Returning to FIG. 8, since the notification by the step 904 from the Packet Header Processor 525 in FIG. 9 causes an event detection by the step 822 in FIG. 8, and since in this case the step 800 determines that the event does not relate to a new packet, the process 820 follows a NO arrow from the step 800 to a step 804. In the step 804, the NPU determines if the event relates to notification of a policy check completed by the Packet Header Processor 525. If this is the case, then the process 820 follows a YES arrow to a step 806 which determines if the applicable policy is the Bypass policy. If this is the case, then the process 820 follows a YES arrow to a step 814 in which the NPU 500 schedules the non-secure packet out of the NPU 500 using either the Ingress Scheduler 506 or the Egress Scheduler 510 as indicated by the dashed arrows 546 or 535. This is where the disclosed decoupled IPsec processing approach achieves the throughput advantage over previous approaches.

Returning to the step 806, if the step returns a logical FALSE value, then the process 820 follows a NO arrow to a step 808. In the step 808, the NPU determines if an Apply policy is called for. If this is the case, then the process 820 follows a YES arrow to a step 816, in which the NPU 500 schedules the whole packet for forwarding to the Packet Transform Processor 526 via lines 532 or 534 for IPsec transformation via the Packet Scheduler 518.

Returning to the step 808, if the step returns a logical FALSE value, then policy must be Discard, so the process 820 follows a NO arrow to a step 818 which schedules the packet for discarding. Execution then returns to step 822 to await the next event.

Returning to the step 816 in FIG. 8, if the step scheduled the packet for transformation by the Packet Transform Processor 526, thereby forwarding the packet to the packet buffer 520 as indicated by the arrow 542, then turning to FIG. 10, the process 1006 is directed from the step 1008 to a step 1000 which determines if a packet has been scheduled for processing by the Packet Transform Processor 526. If this is the case, then in a following step 1002 the Packet Transform Processor 526 transforms the packet using the Transform Unit 522, as indicated by the arrows 544 and 545. In a following step 1004, the Packet Transform Processor 526 notifies the NPU via the lines 527 or 536 that the transformed packet is complete.

Returning to FIG. 8, the notification step 1004 causes an event detection by the step 822, and since the event does not relate to a new packet or a "policy ready" notification, the process 820 is directed to the step 812 in which the NPU determines if the event relates to the notification of a completed transformed packet by the Packet Transform Unit 526. If this is the case, then the process 820 follows a YES arrow to a step 814, in which the NPU 500 retrieves the transformed packet from the packet buffer 520 via the lines 527 or 536, reinserts it into the Ingress queue 504 or the Egress queue 508, and schedules the packet for forwarding out of the unit using the Ingress Scheduler 506 or the Egress Scheduler 510 via the lines 546 or 535.

The disclosed decoupled IPsec processing approach has a number of advantages over current approaches to IPsec processing. In the case of a mixed traffic flow, where only some traffic requires IPsec transformation, a significant advantage is obtained over current approaches. Processing cycles are not wasted by unnecessarily sending non-secure packet data to the SPU, and thus the disclosed decoupled IPsec processing approach reduces latency.

The SPU can determine the packet policy (using the packet header processor 525) even while it (ie the packet transform processor 526) is busy performing a packet transform on an earlier-arrived packet. Thus the result of the policy check can be known earlier than in other architectures. Knowing the result of the policy check can be beneficially applied to non-secure packets by making use of a "fast path" from the Ingress Queue 504 to the Ingress Scheduler 506 or from the Egress Queue 508 to the Egress Scheduler 510, and effectively jumping over previously received packets queued for IPsec transformation. The aforementioned "fast paths" arise from the reordering of the packets in the queues 504, 508 arising from the fact that non-secure packets can, in many cases, be scheduled for forwarding ahead of secure packets which were originally ahead of them in the queue.

This significantly improves the throughput and reduces the latency of systems using the decoupled IPsec processing approach that contain a mix of secured and non-secured traffic.

The principle of separation of the policy checking and transformation functions of the SPU into separate, parallel units can also find application in a flow-through architecture, the main difference being that packets are not routed back to the NPU after policy checking (and possibly transformation), but are forwarded directly to the next layer in the protocol stack.

The preferred implementation of the SPU modules 525, 526 uses dedicated hardware, for example ASICs or FPGAs, allowing the NPU and the SPU to operate concurrently, and allowing the Policy Check Unit and the Transform Unit within the SPU to operate concurrently

INDUSTRIAL APPLICABILITY

It is apparent from the above that the arrangements described are applicable to the computer networking and data processing industries.

The foregoing describes only some embodiments of the present invention, and modifications and/or changes can be made thereto without departing from the scope and spirit of the invention, the embodiments being illustrative and not restrictive.

In the context of this specification, the word "comprising" means "including principally but not necessarily solely" or "having" or "including", and not "consisting only of". Variations of the word "comprising", such as "comprise" and "comprises" have correspondingly varied meanings.

I claim:

1. An IPsec processor for performing IPsec processing of traffic packets, the IPsec processor comprising:
   a network processing module; and
   a hardware co-processing module coupled to the network processing module via an interface, the hardware co-processing module comprising a policy check processor, and a packet transform processor; wherein, the network processing module comprises:
   a storing unit for storing a packet in a queue;
   a first communicating unit for communicating a header of the packet, comprising a minimal amount of packet data necessary for performing policy check processing, to the policy check processor via the interface;
   a second communicating unit for, if IPsec processing of the packet is required based on a result signaled by a signaling unit of the policy check processor, communicating the packet including a remainder of the packet not communicated via the first communicating unit to the packet transform processor from the queue via the interface; and
   a first scheduling unit for scheduling an IPsec processed packet which is processed by the packet transform processor based on the packet communicated by the second communicating unit, received from the packet transform processor via the interface, for forwarding from the queue;
   wherein the policy check processor comprises:
   a checking unit for checking the header of the packet communicated by the first communicating unit to determine if IPsec processing of the packet is required; and
   a signaling unit for signaling a result of the checking by the checking unit to the network processing module,
   wherein said checking unit and said signaling unit can process a plurality of successive packet headers while the packet transform processor is applying IPsec processing to said packet; and
   the packet transform processor comprises:
   a reading unit for reading the packet from the queue via the interface based upon the result of the checking;
   an applying unit for applying IPsec processing to the packet; and
   a third communicating means unit for communicating the IPsec processed packet processed by the applying unit to the queue of the network processing module via the interface.

2. An IPsec processor according to claim 1, wherein:
   the packet is one of a set of packets scheduled in a queue for forwarding;
   and
   the network processing module comprises a second scheduling unit for, if the policy check processor determines that IPsec processing of the packet is not required, scheduling the packet for forwarding, thereby placing the packet ahead of a packet which, prior to said determination by the policy check processor, was ahead of the packet in the queue.

3. An IPsec processor according to claim 1, wherein said interface comprises two portions, one said portion being for communication of said part header of said packet to said policy check processor, another said portion being for communicating said packet to said packet transform processor and communicating the IPsec processed packet to the network processing module.

4. An IPsec processor for performing IPsec processing of traffic packets, the IPsec processor comprising:
   (a) a first communicating unit for communicating a header of a packet, comprising a minimal amount of packet data necessary for performing policy check processing, from a network processor module having storage unit for storing the packet in a queue, to a policy check processor via an interface;
   (b) a checking unit for checking, by the policy check processor, the header of the packet communicated by the first communicating unit to determine if IPsec processing of the packet is required;
   (c) a signaling unit for signaling, by the policy check processor, a result of the checking to the network processing module;
   (d) a second communicating unit for, if IPsec processing of the packet is required based on the result signaled by the signaling unit, communicating the packet including a remainder of the packet not communicated via the first communicating unit from the queue of the network processing module to a packet transform processor via the interface;

(e) an Ipsec processing unit for applying IPsec processing to the packet by the packet transform processor, wherein said checking unit and said signaling unit can process a plurality of successive packet headers while the Ipsec processing unit is applying IPsec processing to said packet;

(f) a third communicating unit for communicating the IPsec processed packet processed by the Ipsec processing unit from the packet transform processor to the network processing module via the interface; and (g) a scheduling unit for scheduling, by the network processing module, the IPsec processed packet for forwarding.

5. An IPsec processor for performing IPsec processing of traffic packets, the IPsec processor comprising: a memory for storing a computer-executable program; and a processor for executing the program, wherein said program causes the processor to perform the following steps:

(a) a first communicating step of communicating a header of a packet, comprising a minimal amount of packet data necessary for performing policy check processing, from a network processor module having storage unit for storing the packet in a queue, to a policy check processor via an interface;

(b) checking, by the policy check processor, the header of the packet communicated by the first communicating step to determine if IPsec processing of the packet is required;

(c) signaling, by the policy check processor, a result of the checking by the checking step to the network processing module;

(d) a second communicating step of, if IPsec processing of the packet is required based on the result by the signaling step, communicating the packet including a remainder of the packet not communicated via the first communicating unit from the queue of the network processing module to a packet transform processor via the interface;

(e) applying IPsec processing to the packet by the packet transform processor, wherein said checking and signaling can process a plurality of successive packet headers while the applying IPsec processing is applying IPsec processing to said packet;

(f) a third communicating step of communicating the IPsec processed packet processed by the applying step from the packet transform processor to the network processing module via the interface; and (g) scheduling by the network processing module the IPsec processed packet for forwarding.

6. A non-transitory computer readable storage medium having recorded thereon a computer program for directing a processor to execute a method for performing IPsec processing of traffic packets, wherein said program causes the processor to perform the following steps:

(a) a first communicating step of communicating a header of a packet, comprising a minimal amount of packet data necessary for performing policy check processing, from a network processor module having storage unit for storing the packet in a queue, to a policy check processor via an interface;

(b) checking by the policy check processor the header of the packet communicated by the first communicating step to determine if IPsec processing of the packet is required;

(c) a signaling step of signaling, by the policy check processor, a result of the checking to the network processing module;

(d) a second communicating step of, if IPsec processing of the packet is required based on the result signaled by the signaling step, communicating the packet including a remainder of the packet not communicated via the first communicating unit from the queue of the network processing module to a packet transform processor via the interface;

(e) applying IPsec processing to the packet by the packet transform processor, wherein said code for checking and said code for signaling can process a plurality of successive packet headers while the code for applying IPsec processing is applying IPsec processing to said packet;

(f) a third communicating step of communicating the IPsec processed packet processed by the applying step from the packet transform processor to the network processing module via the interface; and (g) scheduling by the network processing module the IPsec processed packet for forwarding.

7. A method of performing IPsec processing of traffic packets in an apparatus comprising a network processing module and a hardware co-processing module coupled to the network processing module via an interface, the co-processing module comprising a policy check processor, and a packet transform processor, the method comprising, for a current packet among the traffic packets, the steps of:

(a) a first communicating step of communicating a header of the current packet, said header comprising a minimal amount of packet data necessary for performing policy check processing, from the network processor module having storage unit for storing the packet in a queue, to the policy check processor via the interface;

(b) checking by the policy check processor the header of the current packet communicated by the first communicating step to determine if IPsec processing of the current packet is required;

(c) signaling, by the policy check processor, a result of the checking to the network processing module;

(d) a second communicating step of, if IPsec processing of the current packet is required based on the result signaled in the signaling step, communicating the current packet including a remainder of the packet not communicated via the first communicating unit from the queue of the network processing module to the packet transform processor via the interface;

(e) applying IPsec processing to the current packet by the packet transform processor, wherein said checking step and said signaling step can process a plurality of successive packet headers while said applying step is applying the Ipsec processing step to said current packet;

(f) a third communicating step of communicating the IPsec processed packet from the packet transform processor to the network processing module via the interface; and (g) scheduling by the network processing module the IPsec processed packet for forwarding.

8. A method according to claim 7, wherein the checking step comprises determining a policy from a policy database dependent upon the packet header, said policy establishing if IPsec processing of the current packet is required.

9. A method according to claim 8, wherein after the checking step and prior to the second communicating step, the method comprises a policy communicating step of communicating the policy to the network processing module.

10. A method according to claim 9, wherein after the policy communicating step the method comprises the further steps of:
    if the policy is bypass, scheduling by the network processing module the packet for forwarding; and
    if the policy is discard, discarding the packet.

* * * * *